June 4, 1963 K. D. BROADBENT 3,092,813
MAGNETIC DEVICE
Filed May 1, 1961 4 Sheets-Sheet 1

Kent D. Broadbent,
INVENTOR.
BY.
Leonard Golove
ATTORNEY.

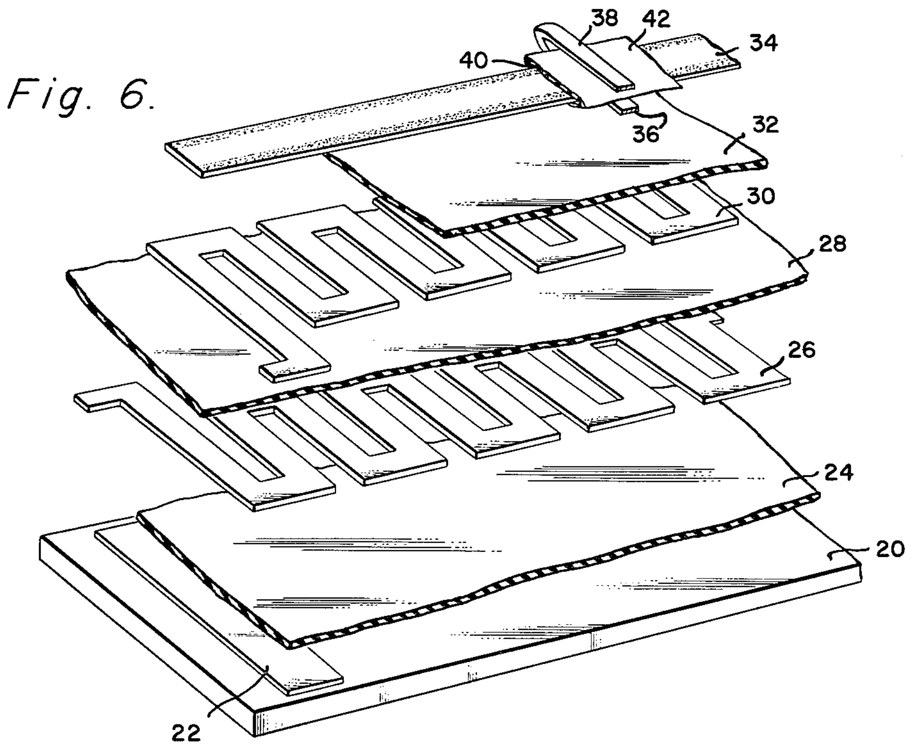
Fig. 6.
Fig. 10.
| TIME | FLIP-FLOP 62 | FLIP-FLOP 72 | "AND" GATE |
|---|---|---|---|
| t1 | 0 | 0 | 84 |
| t2 | 1 | 0 | 80 |
| t3 | 0 | 1 | 82 |
| t4 | 1 | 1 | 78 |
Fig. 4.
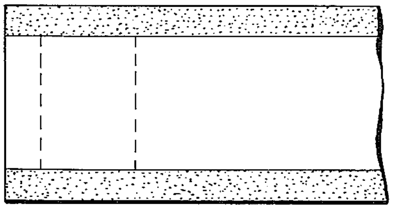
Fig. 5.
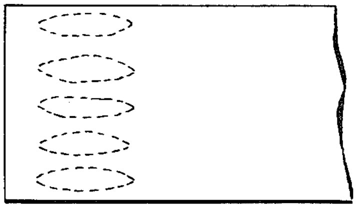
Kent D. Broadbent,
*INVENTOR.*
*BY.*
Leonard Golove
*ATTORNEY.*

Kent D. Broadbent,
*INVENTOR.*

*BY.*

Leonard Golove

*ATTORNEY.*

Kent D. Broadbent,
INVENTOR.
BY.
Leonard Golove
ATTORNEY.

1

3,092,813

MAGNETIC DEVICE

Kent Dastrup Broadbent, San Pedro, Calif., assignor, by mesne assignments, to Broadbent Laboratories, Inc., a corporation of California Filed May 1, 1961, Ser. No. 106,612
5 Claims. (Cl. 340—174)

This invention relates to a magnetic device and more particularly to a device for shifting the position of a magnetic domain established in a magnetic medium from one portion of the medium to another portion thereof.

Devices for shifting the position of a magnetic domain on a magnetic medium have been described. One such device is shown in U.S. Patent No. 2,919,432, inventor K. D. Broadbent, issued December 29, 1959. Such devices present practical difficulties if they are to be used, for example, as a shift register in digital computing systems or the like because of problems encountered in their manufacture and use. One very serious problem results from the fact that magnetic domains must be introduced into the magnetic medium by the coercing action of a writing electrode but that the magnetic domains must not be introduced into the magnetic medium by the coercing action of propagating electrodes. The problem arises because the operating basis of devices of the type described depends upon the fact that the energy required to create a magnetic domain is larger than the energy required to move the domain once created.

It is apparent then that if the necessary creating magnetic field is not significantly larger than the minimum propagating field, it will be extremely difficult or even impossible to construct a practical embodiment of such a device. Prior art devices have yielded at best a ratio of far less than two to one between the creating field and the minimum propagating field. While it is possible, with such a margin, to construct a working shift register, many disadvantages are occasioned by the comparatively narrow margin between the creation and propagation fields. First the construction of a shift register is complicated by the fact that the magnetic properties of materials must be closely controlled, a very difficult achievement with techniques such as vacuum deposition or other presently available methods of manufacture. In addition, layer thicknesses must be uniform and closely controlled, another difficult task. Still another disadvantage is the limitation on the speed of operation of the shift register caused by the fact that the propagating magnetic field must be held to a minimum. This disadvantage results from the fact that speed of operation is directly proportional to the magnitude of the propagating field.

Thus, an object of this invention is to provide an improved device for moving magnetic domains in a magnetic medium.

Another object of this invention is to provide a magnetic shift register which is relatively simple to construct and which allows latitude in the magnetic properties in the magnetic medium and further allows latitude in the thickness and uniformity required in the magnetic medium.

Still another object of this invention is to provide an improved magnetic shift register which is capable of operating at considerably higher speed than prior art devices.

Further and additional objects will become apparent from a study of the following specification and drawings in which.

2

Figures 1, 2:
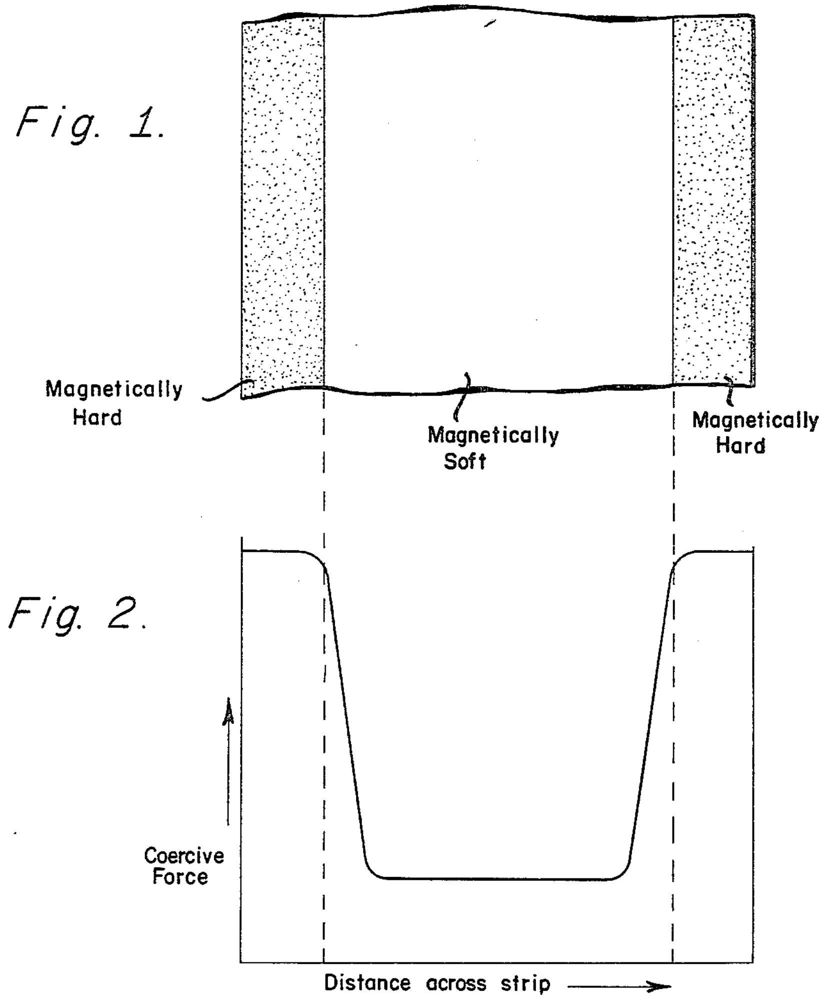
FIG. 1 shows a thin film layer of magnetic material manufactured according to the present invention.
FIG. 2 is a graph of the magnetic properties of the magnetic layer of FIG. 1.
Figure 3:
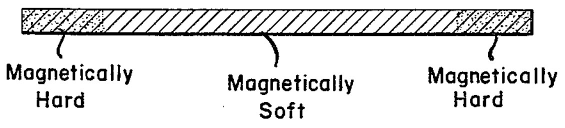

FIG. 3 is a cross sectional view of the magnetic layer of FIG. 1.

FIG. 4 shows a magnetic domain impressed upon the magnetic layer of FIG. 1.

FIG. 5 shows a magnetic domain impressed upon a magnetic layer manufactured in accordance with the prior art.

FIG. 6 is a distorted, idealized, exploded and enlarged view of the thin film layers comprising the present invention and indicating a sequential order of deposition.

Figure 7:
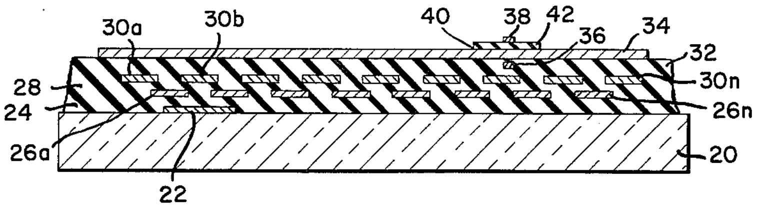

FIG. 7 is an idealized, enlarged vertical sectional view of the device shown in FIG. 6.

FIGS. 8*a*–8*j* are idealized, enlarged, vertical sectional views of the magnetic device of FIGS. 6 and 7 showing the operation of the device.

Figure 9:
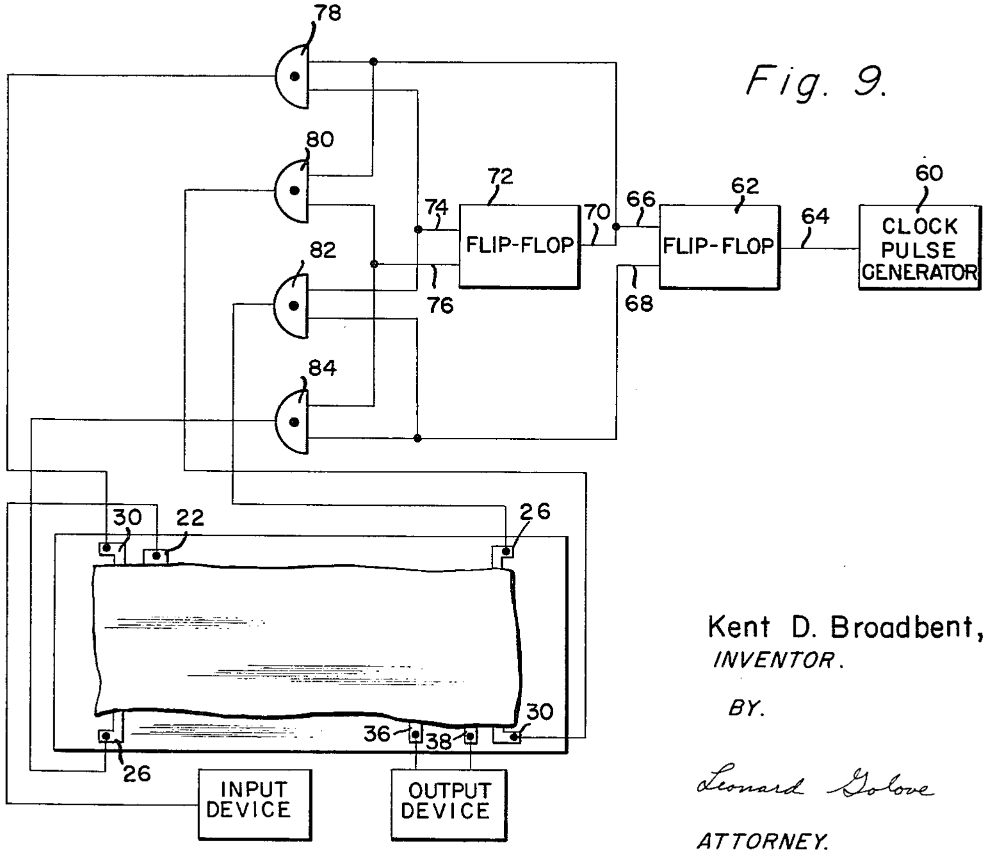

FIG. 9 is a circuit diagram showing the device of FIGS. 6 and 7 in an operative circuit; and FIG. 10 is a table showing the energization of various portions of the circuit of FIG. 9.

The present invention provides the advantages listed above by the use of a magnetic medium having particular properties. Proper selection and achievement of said properties tends to increase the ratio between the creation fields and propagation fields from the relatively low value now achievable to a value much greater than presently possible by application of the principles taught by the prior art. In order to explain completely the nature of the changes to the magnetic medium taught by the present invention as well as the effect of such changes, it is necessary to consider the properties of a magnetic medium in the form of a thin film of magnetic material. In such a medium, the use of a magnetic field having a strength of approximately 2 oersteds is required to create a magnetic domain. On the other hand, it is necessary to provide a magnetic field having a strength of between 1 and 2 oersteds in order to propagate a magnetic domain once created. Experimental studies which have optimized the ratio of creation field to propagation field in a particular nearly perfect medium have indicated that propagation fields of less than 0.008 oersted will produce magnetic domain wall motion whereas fields in excess of 250 oersteds are required for the magnetic domain creation process. Such results may be found in an article entitled "Magnetization Processes: Reversals and Losses," Journal of Applied Physics, vol. 29, Number 3, March 1958.

Thus far, techniques which would tend to reduce the magnitude of the required propagating field have not been completely studied but the considerable variation between the theoretically sufficient propagating field and the actually required propagating field is believed to be due to imperfections in the magnetic medium. However, the present invention does provide a magnetic medium whose magnetic characteristics have been altered to increase the magnetic domain creation field by a considerable factor. Since an increase in creation field increases the ratio between creation and propagation fields, the advantages listed above have been realized by the use of the present invention.

Assuming a uniform magnetic film in which it is desired to create and propagate magnetic domains, it is evident that if a particular domain configuration is desired to be transmitted along the magnetic film the presence of spurious domains created by the propagation process will, depending upon the size and location of such domains, cause noise or other inaccuracies in the propagation of information. It has been observed that these spurious domains are formed first at the edges of the magnetic film. This edge formation of spurious domains is believed to be due to the fact that there are free magnetic poles and surface magnetic fields present at the edges of the magnetic film. These free poles and surface fields subject the edges to extremely high local magnetic fields and the formation of microscopic domain configurations apparently results. Such microscopic domains are potential nucleation sources for the formation of micro-domains when propagating magnetic fields are applied. Since there are already magnetic domain walls present in the edge regions, or since walls are quickly formed under the superimposed influence of the local edge fields and the propagating field, micro-domains may result from a wall motion phenomenon originating at the edge regions, since the propagating field can initiate wall motion. If no micro-domains or relatively high surface magnetic fields are present at the edges of the magnetic film, a much higher propagating field will be required to nucleate spurious domains and effectively higher propagating fields may be used, since the domains will have to be formed by an internal rotational process which requires a much higher coercing field. Thus, higher speed of operation and a greater margin of safety in construction and operation of the device will have been achieved. Suppression of the nucleation of domains formed at the edges of the magnetic films then yields a substantial improvement in the operation of magnetic domain propagation devices.

The present invention provides a means for isolating or insulating that portion of a magnetic film which will be used as an information channel from undesirable effects normally produced by the untreated edges of the magnetic film. This allows the propagating electrodes to operate with relatively the same propagating magnetic field as prior art devices, yet provides a very large margin between the propagation field and the creation field.

The isolation of the information channel from the edges of the magnetic film is accomplished by magnetically hardening the edges of the magnetic film as shown in FIGS. 1 and 3. Magnetic hardening implies an increase in the coercive force of the edge regions so that these edge regions behave more like permanent magnets than like a soft magnetizable iron core. FIG. 2 is a graph having, as its abscissa, the distance across the magnetic film and, as its ordinate, the coercive force of the medium. This graph shows a cross section of the magnetic properties of the magnetic film taken perpendicular to the direction of domain propagation. It may be assumed that the cross section could be taken at any point along the line of domain propagation with uniform results.

The magnetic film having been treated in the fashion described above, the propagating fields can be made to exceed the wall coercive force in the center or information channel region of the magnetic film and the only requirement would be that the propagating field must be greater than the value of the wall coercive force in the central region and less than a value which, when added to the existing local edge fields, does not exceed the value of the wall coercive force in the edge regions. Since relatively large ratios of the magnitude of the coercive force in the edge regions to the magnitude of the coercive force in the central region have been produced, the information channel has been completely insulated from the edge effects which limit the utility of the "uniform magnetic film" devices existing in the prior art.

Even if microscopic magnetic domains are present in the edge regions, choice of a suitable value of coercing field can easily be made at a value which, when superimposed upon any local edge fields which may exist, will still be less than the edge region value of the wall coercive force since the coercing field need only be greater than the relatively small coercive force required to move a magnetic domain wall in the central region. Observation confirms the fact that no growth of microscopic magnetic domains, if any are present in the edge regions, occurs.

Thus, the use of the particular magnetic film taught by the present invention results in a device which may be analogized to a well bounded "pipe line" in which magnetic domain walls may only be introduced by the writing electrode and in which undesired magnetic domains cannot enter the information channel through the sides of the "pipe." Thus, the magnetic film, according to the present invention, comprises a central information channel or soft core bounded by two "permanent magnet" edges which are not and cannot be switched or altered during the operation of the device.

Processes which have yielded sufficient hardening of the desired areas of the magnetic film are well known in the art and have been utilized experimentally for the production of the present invention. Several such processes have been suggested and tested. These include vacuum depositing or otherwise providing a thin film of a hardening element such as copper or aluminum, etc., in the edge regions and subsequent heating of the magnetic film. At relatively high temperatures the hardening element diffuses in the magnetic material and produces a "doped" region exhibiting magnetic hardness or high coercive force. Another technique for hardening the edge regions consists of decreasing the thickness of the edge regions relative to the thickness of the central region. This also tends to make the edge regions magnetically hard. Still another technique is that of processing portions of the substrate surface onto which the magnetic film is deposited, such as by chemical etching of those portions of the substrate surface which underly the edge regions. Such a roughening of the substrate surface alters the structure of the deposited magnetic material and increases the magnetic hardness of the edge regions of the magnetic film.

FIG. 4 shows the appearance of a magnetized zone or domain which has been inserted onto a magnetic film manufactured according to the principles of the present invention. It can be seen that the domain only exists in the soft information channel of the magnetic film and that the edges of the domain are relatively sharp. Such a domain yields an output signal characterized by an extremely high signal-to-noise ratio. FIG. 5 shows a magnetic domain which has been impressed onto a magnetic film manufactured according to the principles of the prior art. Note that the domain extends to the edges of the magnetic film and also note the irregularities appearing at the edges of the magnetic domain. Such a domain yields a relatively poor output signal characterized by a relatively poor signal-to-noise ratio. Both FIGS. 4 and 5 have actually been observed using Kerr optical apparatus which yields visual observations of magnetic domains. The improvement in the structure of the magnetic domain resulting from application of the principles of the present invention is evident.

FIGS. 6 and 7 show a magnetic shift register constructed according to the principles of the present invention.

In all of the description of the operation of the magnetic devices which have been given heretofore and which are to follow, it is to be understood that, while the explanations given appear to be reasonably and qualitatively correct, the description of magnetization phenomena is highly simplified for the purpose of clarity in explanation. In actuality, magnetic domain formation and interaction is known to be extremely complex and the simple explanation offered herein may not fully describe the operation of this invention. It should be further understood that the simplified description of the magnetization phenomena presently believed to account for the operation of this invention is merely supplied for explanatory purposes and that the utility of the invention does not depend upon the accuracy of those principles suggested.

Referring now to FIGS. 6 and 7, there is shown a thin film strip of magnetic material which has been superimposed upon various conducting and insulating layers. In these figures, various dimensions have been distorted so that the details of the invention can be clearly seen.

Investigations have been conducted into the magnetic behavior of ferro-magnetic films deposited on substrates. One such investigation is reported in the Journal of Applied Physics, vol. 26, August 1955, and is entitled "Preparation of Thin Magnetic Films and Their Properties," by M. S. Blois, Jr., at pages 975–980.

The device shown in FIGS. 6 and 7 may be manufactured by successive applications of a vacuum deposition technique in which each of the respective magnetic, insulative and conductive layers shown in FIGS. 6 and 7 are superimposed in an appropriate order. The magnetic layer may be composed of Permalloy or other suitable material and may have a thickness of approximately 1000 A. The conductive layers may be composed of aluminum and the insulative layers of silicon monoxide. The thickness of the conductive and insulative layers may be approximately 10,000 A.

The thickness of the magnetic film layer is governed at the lower limit by the disappearance of ferromagnetic properties while self-demagnetizing effects and the appearance of significant eddy current losses at the relatively high frequencies used in digital computing devices govern the upper limit of said thickness. Since the entire structure shown in FIGS. 6 and 7 is composed of thin films, a carrier or substrate 20 is required. The choice of a suitable substrate is made according to the considerations referred to in the beforementioned Blois article. For the purposes of this invention, a suitable substrate has been found to be a commercially available soft glass which is an insulative medium as required. However, other insulating materials able to withstand higher temperatures may be used.

Upon the substrate 20 there is deposited a plurality of conductive, insulative, and magnetic layers which will be described in detail below. With respect to the various conductive layers, it should be pointed out that their order is not critical and can be varied without impairment of the functioning of the device.

The first layer to be deposited is an input electrode which is a conducting layer 22, rectangular in shape, which is used to impress a stable antiparallel magnetic domain in the magnetic layer to be described. Above the conducting layer 22, an insulating layer 24 is deposited. The insulating layer 24 must have a size and shape designed to prevent electrical contact between the conducting layer 22 and the various conducting and magnetic layers which will be superimposed thereupon. Above the insulating layer 24 is superimposed a pair of propagating electrodes 26 and 30, separated by an insulating layer 28, which is shaped to prevent electrical contact between the propagating electrodes 26 and 30. The propagating electrodes 26 and 30, which are formed of conducting materials, each comprise a plurality of parallel electrode portions 26*a*, 26*b*, . . . 26*n*, and 30*a*, 30*b*, . . . 30*n* (see FIG. 8), extending transversely across the magnetic medium to be described. The electrode portions are electrically connected to form a continuous conductor in a zig-zag pattern such that current in adjacent electrode portions flows in opposite directions. Thus, a current applied to electrode 26 will pass through each of electrode portions 26*a*, 26*b*, . . . 26*n*, such that current flows in opposite directions in portions 26*a* and 26*b*, etc., and similarly a current applied to electrode 30 will pass through each of the portions 30*a*, 30*b*, . . . 30*n*, such that current flows in opposite directions in portions 30*a* and 30*b*, etc. The width of each of the electrode portions must be approximately ½ the width of the input electrode 22. Contiguous electrode portions such as 26*a* and 30*a* must effectively overlap as shown in FIG. 7. As stated, the read-in electrode, conducting layer 22, must have a width approximately twice that of a propagating electrode portion such as 26*a*. However, other embodiments utilizing similar principles of operation can be made using other electrode configurations.

Above the electrode 30 is deposited an insulating layer 32, which must prevent electrical contact between the electrode 30 and superimposed conducting and magnetic layers. Above the insulating layer 32 is deposited a magnetic layer 34, rectangular in shape, which extends across the entire length of the device. The magnetic layer 34 must be treated as described hereinbefore and shown in FIGS. 1 and 3. Thus the magnetic layer 34 actually comprises three portions, a central or information channel of magnetically soft material and two edge channels of magnetically hard material. These channels extend longitudinally along the magnetic layer 34, as shown. Around the magnetic layer 34 is looped an output winding, composed of conducting layers 36 and 38, each rectangular in shape, and deposited such that electrical contact is made between the lower layer 36 and the upper layer 38 at one end of each of these layers. The conducting layers 36 and 38 are prevented from making electrical contact with the magnetic layer 34 and between themselves, except at said one end, by an insulating layer 40 deposited between the conducting layer 36 and the magnetic layer 34, and an insulating layer 42 deposited between magnetic layer 34 and conducting layer 38.

Figure 8:
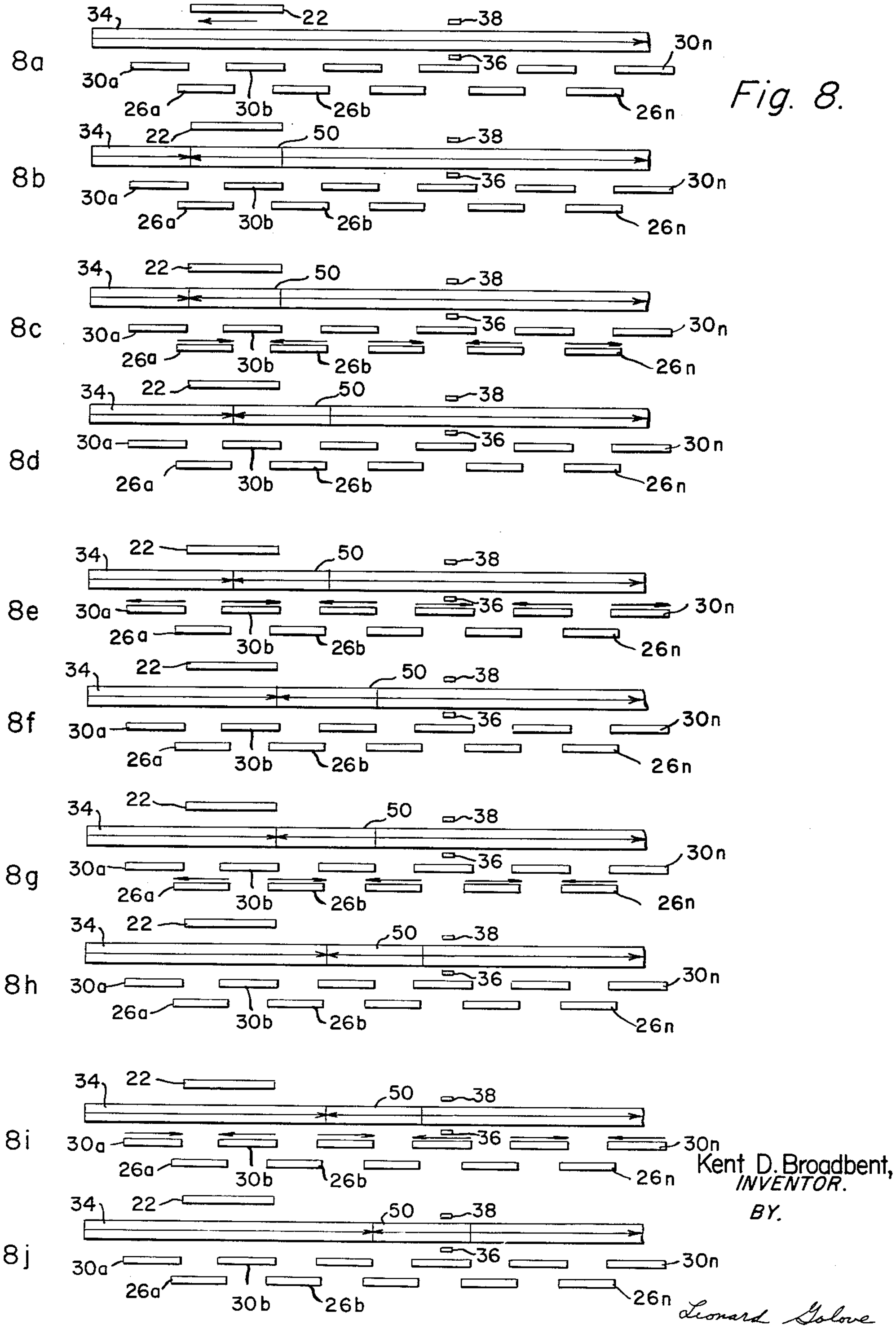

The operation of the shift register shown in FIGS. 6 and 7 is described below with reference to FIGS. 8*a*–8*j*. FIGS. 8*a*–8*j* are schematic representations of a longitudinal cross-section taken through the device of FIGS. 6 and 7 at various times during the operation of the shift register. Note that the conductor 22 is shown above the magnetic layer 34 rather than below that layer. This change is made merely for the purpose of explanatory convenience, and to show a satisfactory alternative arrangement. FIG. 8*a* shows the initial condition of the magnetic medium 34, in which the medium is shown magnetized in a first directon as a single magnetic domain. Binary information will be represented on the medium by considering that an area of magnetization of the medium 34 in a first direction (shown to the right in FIG. 8) denotes a binary "0" and by considering that an area of magnetization of the medium 34 in an opposite or antiparallel direction denotes a binary "1."

In order to record binary information on the medium 34, current is passed through the conductor 22. The passage of current through the conductor 22 causes a magnetic field to appear around the conductor, which field will tend to magnetize the portion of the magnetic sheet 34 adjacent the conductor 22. By controlling the direction of current in the conductor 22, magnetization may be induced, in the portion of the magnetic sheet 34 adjacent the conductor 22, in either said first direction or said antiparallel direction. In order to record a binary "1," current must be passed through the conductor 22 in such a direction as to cause a magnetic field to pass through the medium in an antiparallel direction, as shown in FIG. 8*a*. A binary "0" can be recorded either by passing current through the conductor 22 in the opposite direction or by not supplying current to the conductor 22, since the magnetic sheet 34 has an initial magnetization in the "0" direction.

The area of antiparallel magnetization produced by appropriate energization of the conductor 22 will be stable and will remain after the inducing current is removed from the conductor 22. FIG. 8*b* shows the condition of the medium after current has been removed from the conductor 22. It can be seen in FIG. 8*b* that a stable area of an antiparallel state of magnetization 50 has been created in the magnetic medium 34.

FIGS. 8*c*–8*j* show the condition of the magnetic medium and the conditions of the electrodes 26 and 30 at various times between the recording of information by the input electrode 22 and the read-out of information by the output electrode, conductors 36 and 38. FIG. 8*c* shows the first step in the motion cycle which involves actuating the electrode 26 by passing current through the entire electrode 26 in a first direction. From the shape of the electrode shown and described in connection with FIGS. 6 and 7, it can be seen that if electrode portion 26*a* is producing a magnetic field of a first direction, then electrode portion 26*b* will be producing a magnetic field of an antiparallel direction and successive electrode portions (26*c*, 26*d*, . . . 26*n*) will produce magnetic fields of alternatively opposite directions. This is evident from the fact that the electrode is constructed so that current passes in a first direction in the first electrode portion 26*a* and in an opposite direction in each of the succeeding electrode portions. FIG. 8*c* then shows the actuation of the electrode 26 by the passage of current through the electrode in the first direction. From considerations given above, it can be seen that both boundaries of the antiparallel zone 50 shown in FIG. 8*c* will move from the position shown in FIG. 8*c* to the position shown in FIG. 8*d*.

Referring to FIG. 8*c*, it should be noted that the magnetic film 34 is provided with an initial state of magnetization as shown in FIG. 8*a* by an arrow pointing to the right. A stable antiparallel magnetic domain or zone 50 is then created as shown in FIGS. 8*a* and 8*b*. This zone may be propagated or shifted along the magnetic film 34 by setting up a suitable coercing magnetic field sufficient to allow the zone to move within the magnetic film but not sufficient to create a new zone. The propagation of the zone results from the passage of current through the electrodes 26 and 30 in a particular manner which will be described below and by control of the magnitude of electric current allowed to flow through the propagating electrodes 26 and 30. In FIG. 8*c* it can be seen that the electrode portion 26*a* has been provided with electric current resulting in a magnetic field shown in the right in FIG. 8*c*. The electrode portion 26*b* has been provided with electric current resulting in a magnetic field shown to the left in FIG. 8*c*. As has been described above passage of current through the electrode 26 will result in opposite directions of magnetic field in adjacent electrode portions such as portions 26*a* and 26*b*. The magnetic field produced by the propagating electrode portions 26*a* and 26*b* will result in a motion of the antiparallel zone 50 to the position shown in FIG. 8*d* since the magnetization of the electrode portion 26*a* will cause movement of the left boundary of the antiparallel zone 50 and the energization of the electrode portion 26*b* will cause the motion of the right boundary of the antiparallel zone 50 to the positions shown in FIG. 8*d*.

It should be noted that other electrode portions, such as the electrode 26*n*, will also tend to create zones which would be reversed in magnetization from the adjacent portion of the magnetic film 34. However, since the coercing forces supplied by the propagating electrode portions 26*a*–26*n* are less than that coercing force required to create a magnetic domain or zone in the absence of a domain wall, no stable magnetization of the magnetic film 34 which might tend to be created will actually appear when the current is removed from the propagating electrode portions 26*a*–26*n*.

As has been discussed above, it is the structure of the magnetic film 34 taught by the present invention which ensures that portions of the propagating electrodes 26 and 30 will not create stable magnetic domains at locations such as adjacent electrode portion 26*n* in the magnetic film 34 which are not adjacent already existing domain walls. It is the disadvantage of the prior art that, because of the relatively small ratio of creation field to propagation field, undesired stable magnetic domains tend to be created in the magnetic layer by the action of the propagating electrodes and errors in the information carried in the magnetic layer 34 result. Conversely, by the use of the particular magnetic layer 34 taught herein, the creation of undesired stable magnetic domains and consequent computational errors are avoided even when larger propagating fields than the minimum required for propagation are used in an effort to attain higher propagation speeds. Thus, the present invention teaches means for avoiding errors while actually achieving increased speed of operation.

During the next step in the motion cycle, the electrode 30 is actuated by passing current through the electrode in the first direction. This passage of current produces opposite magnetic fields at each of the adjacent electrode portions and causes the motion of the stable magnetic zone from the position shown in FIG. 8*e* to the position shown in 8*f* as described above. During the next interval of the motion cycle, the electrode 26 is again actuated but in the opposite direction, producing a movement of the stable antiparallel magnetic domain or zone 50 from the position shown in FIG. 8*g* to the position shown in FIG. 8*h* and as described in connection with FIGS. 8*c* and 8*d*. During the last portion of the motion cycle, the electrode 30 is actuated in the opposite direction, producing a movement of the stable antiparallel magnetic zone 50 from the position shown in FIG. 8*i* to the position shown in FIG. 8*j*.

During this portion of the motion cycle, it can be seen that the stable antiparallel magnetic zone 50 has passed under the output winding composed of conductors 36 and 38. Since a change in magnetization has occured in an area enclosed by an output winding, an output pulse will appear across the conductors 36 and 38. This output pulse can be used to determine the condition or direction of magnetization of the medium. Thus, a shift register has been described. It can be seen that the output winding can be placed wherever desired to yield any desired time delay and that a shift register of any length may be fabricated. It should be appreciated also that, while the description above only included a single input pulse, in practice a succession of pulses representing binary numbers would, in fact, be used. Thus, some time after a first antiparallel magnetic domain has been moved out of the input area, as shown in FIG. 8*h*, a second antiparallel domain may be created in the medium. Thus, a series of domains may be created and propagated. This required time spacing is approximately equal to the width of a stable domain.

The circuitry for supplying the proper energization of the propagating electrodes 26 and 30 will now be described with reference to FIG. 9. This circuitry must supply, at a first time, an electric current of a first direction to the electrode 26. At a second time, electric current of the first direction must be supplied to the electrode 30. At a third time, electric current of a second (opposite) direction must be supplied to the electrode 26. At a fourth time, electric current of the second direction must be supplied to the electrode 30.

One embodiment of circuitry which will supply the above-defined currents comprises a clock pulse generator 60 which supplies a series of electrical pulses. The clock pulse generator 60 is connected to a first flip-flop 62 which is of the type having a single input 64 and two complementary outputs 66 and 68. As is well known in the art, such a flip-flop will change state whenever it receives an input pulse. Thus, upon receiving a first pulse, the output 66 assumes a relatively high voltage and the output 68 assumes a relatively low voltage. Upon receiving a second pulse, the output will be reversed; that is, the output 66 will assume a relatively low voltage and the output 68 will assume a relatively high voltage. Upon receiving successive pulses, the status of the outputs 66 and 68 will correspondingly reverse.

The output 66 is connected to input 70 of a second flip-flop 72, which has outputs 74 and 76. The flip-flop 72, which operates upon a decrease in voltage, will change state, that is, the relative voltages of its outputs, whenever the output 66 of the flip-flop 62 changes its state from a relatively high voltage to a relatively low voltage.

Such a change of state of the flip-flop 72 occurs upon every second clock pulse supplied to the flip-flop 62. Thus, if we consider that a first clock pulse sets both flip-flops 62 and 72 to a condition when the outputs 66 and 74 are both relatively low, the second clock pulse will set the flip-flop 62 to a condition in which the output 66 is relatively high and will not affect the flip-flop 72, leaving the output 74 in a low state. A third clock pulse will set the flip-flop 62 to a condition in which the output 66 is relatively low and will set the flip-flop 72 to a condition in which the output 74 is relatively high. A fourth clock pulse will set the flip-flop 62 to a condition in which the output 66 is relatively high and will not affect the flip-flop 72, leaving the output 74 in a high state. A fifth clock pulse will set both outputs 66 and 74 to a relatively low condition initiating another cycle.

The outputs 66 of flip-flop 62 and 74 of flip-flop 72 are connected to the inputs of a first conventional "and" gate 78. The outputs 66 of flip-flop 62 and 76 of flip-flop 72 are connected to the input of a second "and" gate 80. The output 68 of the flip-flop 62 and the output 74 of the flip-flop 72 are connected to the inputs of a third "and" gate 82. The output 68 of the flip-flop 62 and the output 76 of the flip-flop 72 are connected to the inputs of a fourth "and" gate 84.

In FIG. 10, column I identifies the particular times constituting an operating cycle of the propagating electrodes 26 and 30. Column II shows the state of the flip-flop 62, a "0" representing a relatively low voltage at the output 66 and a relatively high voltage at output 68, and a "1" representing a relatively high voltage on the output 66 and a relatively low voltage on the output 68. Column III shows the state of the flip-flop 72 with "0" representing a state in which output 74 has a relatively low voltage and output 76 has a relatively high voltage, and "1" representing a state in which output 74 has a relatively high voltage and output 76 has a relatively low voltage.

Since, in general, an "and" gate will provide a relatively high voltage at its output only when all of its inputs are supplied with a relatively high voltage, column IV shows which of the "and" gates will provide a relatively high voltage at its output for each of the four possible states of the flip-flops 62 and 72. It can be seen that only one "and" gate can possibly provide a relatively high voltage at a particular time and that the other "and" gates have a relatively low voltage on other outputs. Thus, at time 1, the "and" gate 84 has a relatively high voltage and is connected to one terminal of the propagating electrode 26. A return path is provided from the other terminal of the propagating electrode 26 to the "and" gate 82 which has a relatively low voltage at its output. At time 2, the "and" gate 80 is connected to one terminal of the propagating electrode 30 and supplies a relatively high voltage to its terminal. The return path is provided from the other terminal of the propagating electrode 30 to the "and" gate 78 which has a relatively low voltage at its output. At time 3, a relatively high voltage is supplied by the "and" gate 82 to one terminal of the propagating electrode 26 which has a return path from its opposite terminal to the "and" gate 84. At time 4, a relatively high voltage is supplied by the "and" gate 78 to one terminal of the propagating electrode 30 which has a return path from its opposite terminal to the "and" gate 80. It can be seen that the directions of current produced by the voltages described provide proper actuation of the propagating electrodes.

The vacuum evaporation technique employed in constructing this novel magnetic element is conventional and well-known in the art. Sufficient to say for the purposes of this invention that the magnetic element may be built up by the sequential evaporation of each thin film layer by means of an individual mask having the configuration of the desired layer to be deposited. However, thin film devices may also be produced by other techniques than vacuum deposition. For example, the required configuration of conducting, insulting and magnetic films may be produced by such processes or combinations of processes as electro deposition, electrophoresis, silk screening techniques, or various inking, sketching, and printing techniques which allow thin planes of materials to be defined, registered and applied upon a subsurface.

It should be noted that the dimensions given herein above for the various thin film layers are not to be construed as limited thereto but are merely indicative of a preferable structure compatible with thin film considerations. The order of depositing the various conductive layers may also be varied from the order described.

It will now be appreciated that a novel and improved thin film magnetic element has been disclosed. This element may employ a pair of propagating electrodes, as shown, or it may be constructed with a pair of propagating electrodes on each side of the magnetic layer. In such a case, electrode 26 would have an associated electrode disposed in a vertical alignment and in electrical continuity with the electrode 26. Similarly, the electrode 30 would have an associated electrode disposed in vertical alignment and in electrical continuity with the electrode 30. The use of a pair of electrodes should provide sharper and better defined magnetized zones.

While the operation of the device as a shift register has been shown in a 4-beat cycle, it should be understood that other cycles containing different numbers of beats (electrode actuation patterns) may be used.

What is claimed is:

1. A magnetic device comprising an elongated magnetic medium having a pair of edge portions comprising areas extending longitudinally along the edges of said medium and an inner portion extending longitudinally along said medium between said edge portions, said edge portions having a magnetic hardness which is high relative to the magnetic hardness of said inner portion, said inner portion having a first state of magnetization; input means magnetically coupled to said magnetic medium at a first predetermined place thereof for establishing in said magnetic medium an area of a second state of magnetization; output means responsive to the state of magnetization of said magnetic medium at a second predetermined place thereof spaced from said first predetermined place by a continuous portion of said magnetic medium; and means magnetically coupled to said magnetic medium along said continuous portion thereof for moving the area of said second state of magnetization from said first predetermined place to said second predetermined place on said magnetic medium within said continuous portion thereof.

2. A magnetic device comprising an elongated magnetic medium having a pair of edge portions comprising areas extending longitudinally along the edges of said medium and an inner portion extending longitudinally along said medium between said edge portions, said edge portions having a magnetic hardness which is high relative to the magnetic hardness of said inner portion, said inner portion having a first state of magnetization; input means responsive to electrical signals and magnetically coupled to said magnetic medium at a first predetermined place thereof for establishing in said magnetic medium an area of a second state of magnetization in accordance with said electrical signals; output means responsive to the state of magnetization of said magnetic medium at a second predetermined place thereof spaced from said first predetermined place by a continuous portion of said magnetic medium for providing electrical signals in accordance with said state of magnetization; and means magnetically coupled to said magnetic medium along said continuous portion thereof for moving the area of said second state of magnetization from said first predetermined place to said second predetermined place on said magnetic medium within said continuous portion thereof.

3. A magnetic device comprising an elongated magnetic medium having a pair of edge portions comprising areas extending longitudinally along the edges of said medium and an inner portion extending longitudinally along said medium between said edge portions, said edge portions having a magnetic hardness which is high relative to the magnetic hardness of said inner portion, said inner portion having a first state of magnetization; input means magnetically coupled to said magnetic medium at a first predetermined place thereof for establishing in said magnetic medium an area of a second state of magnetization; output means responsive to the state of magnetization of said magnetic medium at a second predetermined place thereof spaced from said first predetermined place by a continuous portion of said magnetic medium; and means magnetically coupled to said magnetic medium along said continuous portion thereof for moving the area of said second state of magnetization from said first predetermined place to said second predetermined place on said magnetic medium within said continuous portion thereof, said moving means being arranged and defined with respect to said medium to be effective to shift the position of said area in steps.

4. A magnetic device comprising an elongated magnetic medium having a pair of edge portions comprising areas extending longitudinally along the edges of said medium and an inner portion extending longitudinally along said medium between said edge portions, said edge portions having a magnetic hardness which is high relative to the magnetic hardness of said inner portion, said inner portion having a first state of magnetization; input means magnetically coupled to said magnetic medium at a first predetermined place thereof for establishing in said magnetic medium area of a second state of magnetization; output means responsive to the state of magnetization of said magnetic medium at a second predetermined place thereof spaced from said first predetermined place by a continuous portion of said magnetic medium; and a plurality of propagating electrodes magnetically coupled to said magnetic medium along said continuous portions thereof for moving the area of said second state of magnetization from said first predetermined place to said second predetermined place on said magnetic medium within said continuous portion thereof, each of said plurality of electrodes arranged to be effective upon energization thereof to produce a coercive force in said medium on overlapping portions of said medium.

5. A magnetic device according to claim 4 and including a first source of electric current adapted to be coupled to said input means and providing electric current of magnitude sufficient to establish a stable zone of magnetization within said medium, and a second source of electric current adapted to be controllably coupled to said propagating electrodes, said second electric current source providing electric current of magnitude less than the magnitude of electric current provided by said first source.

No references cited.